(12) United States Patent
Saulsbury et al.

(10) Patent No.: US 8,266,633 B1
(45) Date of Patent: Sep. 11, 2012

(54) METHOD AND MESSAGE HANDLING HARDWARE STRUCTURE FOR VIRTUALIZATION AND ISOLATION OF PARTITIONS

(75) Inventors: Ashley Saulsbury, Los Gatos, CA (US); Quinn A. Jacobson, Sunnyvale, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1132 days.

(21) Appl. No.: 12/069,800

(22) Filed: Feb. 12, 2008

Related U.S. Application Data

(60) Provisional application No. 60/901,363, filed on Feb. 13, 2007.

(51) Int. Cl.
*G06F 15/163* (2006.01)

(52) U.S. Cl. ............................................ 719/314; 718/1

(58) Field of Classification Search .................. 719/314; 718/1
See application file for complete search history.

(56) References Cited

U.S. PATENT DOCUMENTS

| | | | | |
|---|---|---|---|---|
| 6,704,831 | B1 * | 3/2004 | Avery | 710/310 |
| 2005/0102671 | A1 * | 5/2005 | Baumberger | 718/1 |
| 2008/0109564 | A1 * | 5/2008 | Arndt et al. | 710/3 |
| 2008/0114916 | A1 * | 5/2008 | Hummel et al. | 710/266 |
| 2008/0146281 | A1 * | 6/2008 | Cohen et al. | 455/558 |

OTHER PUBLICATIONS

Sun Microsystems, "UltraSPARC Virtual Machine Specificaiton Revision 1.0", (Jan. 24, 2006) [retrieved from http://arc.opensolaris.org/caselog/FWARC/2005/116/inception.materials/api.pdf].*

Liu, J.; Huang, W.; Abali, B.; Panda, D., "High Performance VMM-Bypass I/O in Virtual Machines" Proceedings of the 2006 USENIX Annual Technical Conference, Boston, MA, May 30-Jun. 3, 2006 [retrieved from http://www.nejc.net/diploma/doma/clanki/usenix06.pdf].*

Sun Microsystmes, "UtraSPARC Architecture 2005 Draft D0.8.7", (Mar. 27, 2006) [retrieved from http://oss.org.cn/ossdocs/server_storage/opensparc/UA2005-current-draft-P-EXT.pdf].*

Sun Microsystems, UltraSPARC Architecture 2005, Draft D0.7.5, Jan. 3, 2006, Edition: Hyperprivileged, Part No. 950-4895-03, 666 pages.

(Continued)

*Primary Examiner* — H. S. Sough
*Assistant Examiner* — Brian Wathen
(74) *Attorney, Agent, or Firm* — Fliesler Meyer LLP

(57) ABSTRACT

A computer-based method configures a hardware circuit to transfer a message to a message queue in an operating system. The hardware circuit is used to transfer a message to the message queue in the operating system without requiring use of either the operating system or a hypervisor associated with the operating system. The configuring includes tieing (i) a value in a head pointer register with a head pointer for the message queue stored in the hardware circuit and (ii) a value in a tail pointer register for the message queue with a tail pointer for the message queue stored in the hardware circuit so that the value in the head pointer register equals the stored head pointer and the value in the tail pointer register equals the stored tail pointer. The using the hardware circuit uses a logical identifier associated with the message to select an entry in a mapping table of the hardware circuit. A value in the entry in the mapping table is used to select an entry in an action table. The entry in the action table is used to determine a tail pointer for the message queue. The hardware circuit appends the message to a location indicted by the tail pointer without requiring cycles of a hypervisor associated with the strand.

11 Claims, 13 Drawing Sheets

OTHER PUBLICATIONS

Sun Microsystems, UltraSPARC Architecture 2005, Draft D0.7.5, Jan. 3, 2006, Edition: Privileged, Part No. 950-4895-03, 550 pages.

Sun Microsystems, UltraSPARC Architecture 2005, Draft D0.8, Jan. 19, 2006, Privilege Levels: Nonprivileged and Privileged, Part No. 950-4895-03, 558 pages.

Sun Microsystems, SUN4v Hypervisor API, Revision 0.16, Mar. 4, 2005, 35 pages. [retrieved from http://arc.opensolaris.org/caselog/FWARC/2005/116/inception.materials/api.pdf].

Sun Microsystems, (Ashley Saulsbury), UltraSPARC Virtual Machine Specification (The Hypervisor API specification for Logical Domains), May 2008, 293 pages. [retrieved from http://kenai.com/downloads/hypervisor/Hypervisor-api-2.0.pdf].

Sun Microsystems, UltraSPARC Virtual Machine Specification (The Hypervisor API specification for Logical Domains), May 2008, 293 pages. [retrieved from http://kenai.com/downloads/hypervisor/Hypervisor-api-2.0b.pdf].

Sun Microsystems, UltraSPARC Virtual Machine Specification, 360 pages. [retrieved from http://kenai.com/downloads/hypervisor/hypervisor-api-3.0draft2.pdf], (Jan. 15, 2010).

Sun Microsystems, UltraSPARC Virtual Machine Specification, 365 pages. [retrieved from http://kenai.com/downloads/hypervisor/hypervisor-api-3.0draft3.pdf, (Mar. 1, 2010).

Sun Mircosystems, UltraSPARC Virtual Machine Specification, 365 pages. [retrieved from http://kenai.com/downloads/hypervisor/hypervisor-api-3.0draft4.pdf], (May 7, 2010).

Oracle, UltraSPARC Virtual Machine Specification, 357 pages. [retrieved from http://kenai.com/downloads/hypervisor/hypervisor-api-3.0draft6.pdf], (Apr. 21, 2011).

Oracle, UltraSPARC Architecture 2007 One Architecture . . . Multiple Innovative Implementations, Draft D0.9.4, Part No. 950-5554-15, Sep. 27, 2010, 610 pages. [retrieved from http://www.opensparc.net/docs/UA2007-current-draft-HP-EXT.pdf].

Sun Microsystems, UltraSPARC Architecture 2005, Draft D0.8.7, Part No. 950-4895-07, Privilege Levels: Hyperprivileged, Privileged and Nonprivileged, Mar. 27, 2006, 656 pages. [retrieved from http://oss.org.cn/ossdocs/server_storage/opensparc/UA2005-current-draft-HP-EXT.pdf.

Sun Microsystems, UltraSPARC Architecture 2007 One Architecture . . . Multiple Innovative Implementations, Draft D09.3b, Part No. 950-5554-14, Oct. 20, 2009, 460 pages. [retrieved from http://www.opensparc.net/docs/UA2007-current-draft-P-EXT.pdf].

Sun Microsystems, Sun4v Hypervisor Core API Specification, Revisions 0.21, Mar. 23, 2005, 46 pages. [retrieved from http://arc.opensolaris.org/caselog/FWARC/2005/116/commitment2.materials/api.pdf].

Sun Microsystems, (David L. Weaver), OpenSPARC Architecture Generations, 13 pages. [retrieved from http://www.opensparc.net/docs/2008-Oct-OpenSPARC-Slide-Cast-Part-03-DW.pdf].

* cited by examiner

FIG. 4

| MSI Mapping Table | | | | | 310A |
|---|---|---|---|---|---|
| Valid | Dup | Target | Mode | Permission | |
| ... | ... | ... | ... | ... | |

| Message Mapping Table | | | 320A |
|---|---|---|---|
| Valid | Target | Mode | |
| ... | ... | ... | |

| Event Queue Action Table | | | 330A |
|---|---|---|---|
| State | Head Ptr | Tail Ptr | |
| ... | ... | ... | |

| Device Mondo Mapping Table | | | | | 340A |
|---|---|---|---|---|---|
| Valid | State | Group | Mode | Select | |
| ... | ... | ... | ... | ... | |

| Mondo Action Table | | | | | | 350A |
|---|---|---|---|---|---|---|
| Base | Size | Head | Tail | Act | Strand | |
| ... | ... | ... | ... | ... | ... | |

Memory

METHOD AND MESSAGE HANDLING HARDWARE STRUCTURE FOR VIRTUALIZATION AND ISOLATION OF PARTITIONS

RELATED APPLICATION

This application claims the benefit of:
U.S. Provisional Application No. 60/901,363 filed Feb. 13, 2007 entitled "A METHOD AND MESSAGE HANDLING HARDWARE STRUCTURE FOR VIRTUALIZATION AND ISOLATION OF PARTITIONS" and naming Ashley Saulsbury and Quinn A. Jacobson as inventors, which is incorporated herein by reference in its entirety.

BACKGROUND OF THE INVENTION

1. Field of the Invention

The present inventions relates generally to communications with I/O devices in computer systems, and more particularly to message management in computer systems.

2. Description of Related Art

Various mailbox mechanisms have been implemented to transfer information from one entity to another entity in a computer system. For example, in computer system 100 (FIG. 1A), virtual processors 125 (including app 121 and operating system 122) and 135 (including app 131 and operating system 132) are not active on processor 114. Virtual processor 115 is executing on processor 114.

Hypervisor 113 is a software layer between an operating system 125 and physical processor 114. Hypervisor 113 is responsible for maintaining information so that when either virtual processor 125, or virtual processor 135 again has access to processor 114, the state of the virtual processor is restored so that processing can continue from the point where the processing was last stopped.

Typically, a mechanism was provided for communicating between virtual processors. For example, operating system 102 may write a message in mailbox 106 and send a command to hypervisor 103 that is operating on processor 104 to send the message to virtual processor 135.

Hypervisor 103 writes the message to a common memory area 150 (FIG. 1B) and interrupts hypervisor 113. It is not particularly important whether processor 104 and processor 114 are included on the same chip, on chips in a common physical location, or in different physical locations so long as there is a communication line between processors 104 and 114.

Hypervisor 113 (FIG. 1C) that is currently executing virtual processor 115 (including app 111 and operating system 112) steals cycles on processor 114 and reads the message from common memory area 150 in response to the interrupt. Hypervisor 113 determines that the message is for virtual processor 135. Accordingly, hypervisor 113 writes the message to queue 136.

When virtual processor 135 again becomes active, non-empty queue 136 causes an interrupt to be generated. Accordingly, virtual processor 135 processes the message in queue 136. While this method of communication has several advantages, the processor cycles required by hypervisor 113 to process a message for a virtual processor 135 that is not executing diminishes the performance of executing virtual processor 115.

SUMMARY OF THE INVENTION

In one embodiment, a novel method is used to communicate information to an inactive virtual processor. Unlike the prior art methods, this method does not steal processing cycles, but does provide the virtual processor with the information so that when the virtual processor again becomes active the information is available.

In one embodiment, the computer-based method configures a hardware circuit to transfer a message to a message queue in an operating system. The hardware circuit is used to transfer the message to the message queue in the operating system without requiring use of either the operating system or a hypervisor associated with the operating system.

In one embodiment, the configuring the hardware circuit includes tying (i) a value in a head pointer register with a head pointer for the message queue stored in the hardware circuit and (ii) a value in a tail pointer register for the message queue with a tail pointer for the message queue stored in the hardware circuit so that the value in the head pointer register equals the stored head pointer and the value in the tail pointer register equals the stored tail pointer.

The hardware circuit uses a logical identifier associated with the message to select an entry in a mapping table of the hardware circuit. A value in the entry in the mapping table is used to select an entry in an action table. The entry in the action table is used to determine a tail pointer for the message queue. The hardware circuit appends the message to a location indicted by the tail pointer without requiring cycles of a hypervisor associated with the strand.

One embodiment of a processor used to implement the computer-based method includes at least one strand. The strand includes a message queue; a head pointer register for the message queue; and a tail pointer register for the message queue. The processor also includes a hardware system interface unit. The system interface unit includes an action table having an action table entry including a tail pointer field, a head pointer field, an action field, and a strand field. When the action field stores a tied value and the strand field stores a value associated with the at least one strand, a value in tail pointer field equals a value in the tail pointer register and a value in the head pointer field equals a value in the head pointer register.

The system interface unit includes a mapping table having at least one mapping table entry. The at least one mapping table entry is selected by a logical identifier. The at least one mapping table entry includes a target field having a value used for selecting the action table entry in the action table.

In one embodiment, the mapping table is a device mondo mapping table. In another embodiment, the mapping table is a message mapping table.

In yet another embodiment, a computer implemented method includes receiving, by a system interface unit in a processor, a message having a logical identifier. The system interface unit uses the logical identifier to select a mapping table entry in a mapping table. The mapping table entry includes a target field storing a value. The system interface unit uses the value in the target field to select an action table entry in an action table. The action table entry in the action table includes a strand field storing an identifier for a strand; an action field storing a value indicating the strand is in a tied mode; a tail pointer field storing a value equal to a value in a tail pointer register in the strand. The system interface unit writes the message to a location in a queue in the strand addressed using the value in the tail pointer field without requiring execution cycles from a hypervisor associated with the strand.

BRIEF DESCRIPTION OF THE DRAWINGS

FIG. 4 is a more detailed illustration of one embodiment of the tables in the hardware system interface unit of FIG. 3.

In the drawings and the following detailed description, elements with the same reference numeral are the same or equivalent elements. Also, the first digit of a reference numeral represents the figure number of the figure in which the element associated with the reference numeral first appears.

GLOSSARY OF TERMS

Figure 1A:
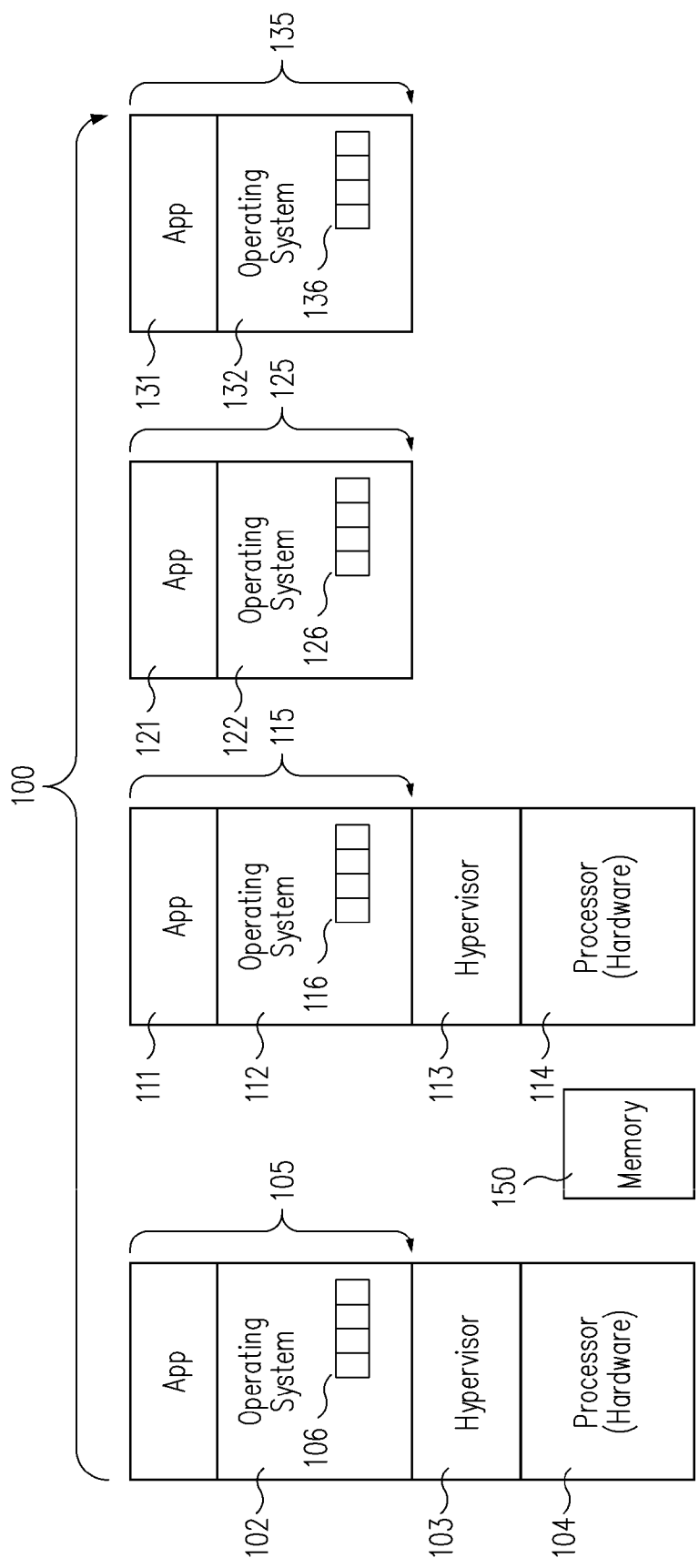
FIG. 1A is an illustration of a prior art system that included active and inactive virtual processors.
Figure 1B:
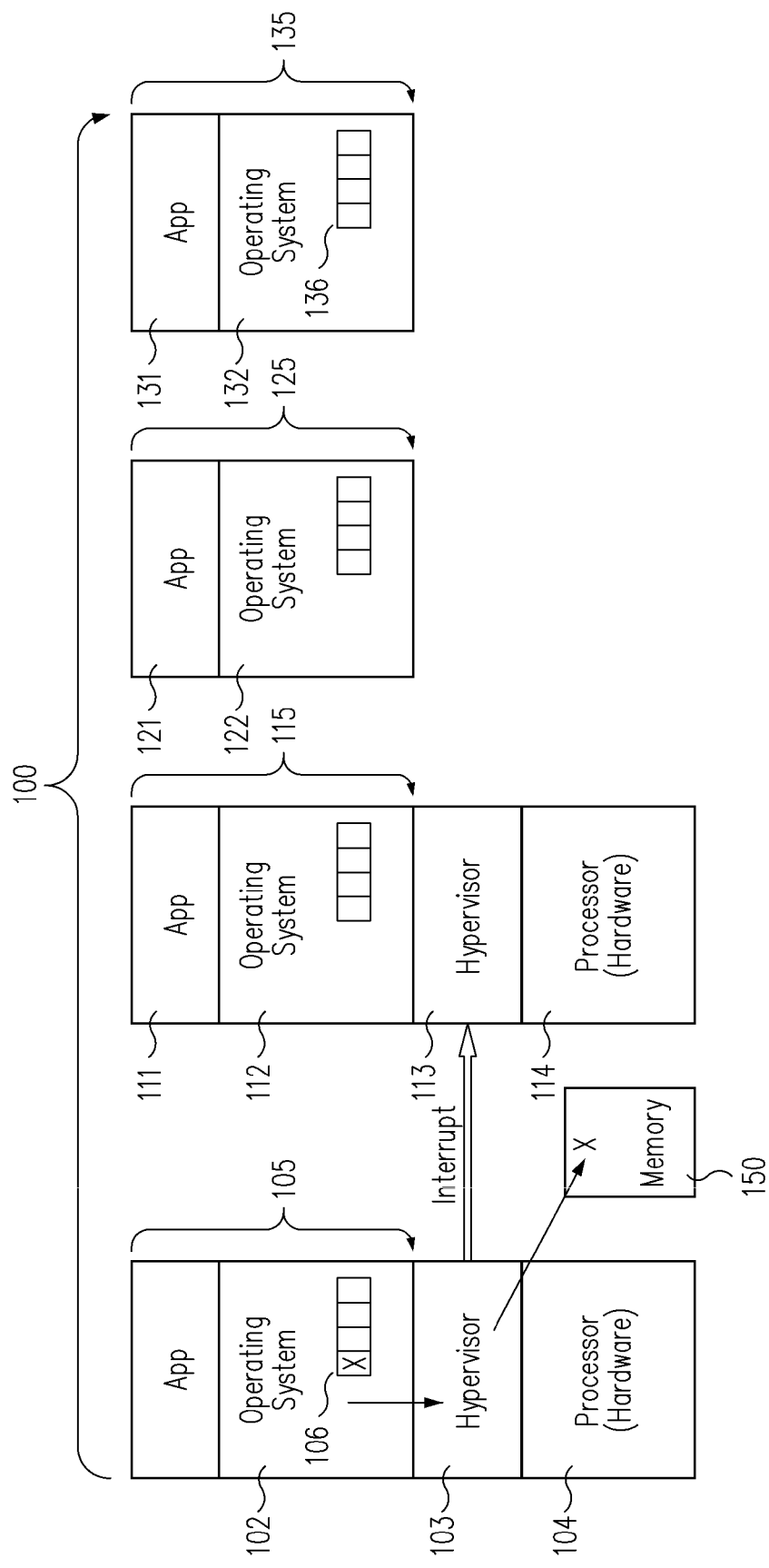
FIG. 1B is an illustration of the prior art system of FIG. 1A where a message is written to a memory and a first hypervisor sends an interrupt to a second hypervisor.
Figure 1C:
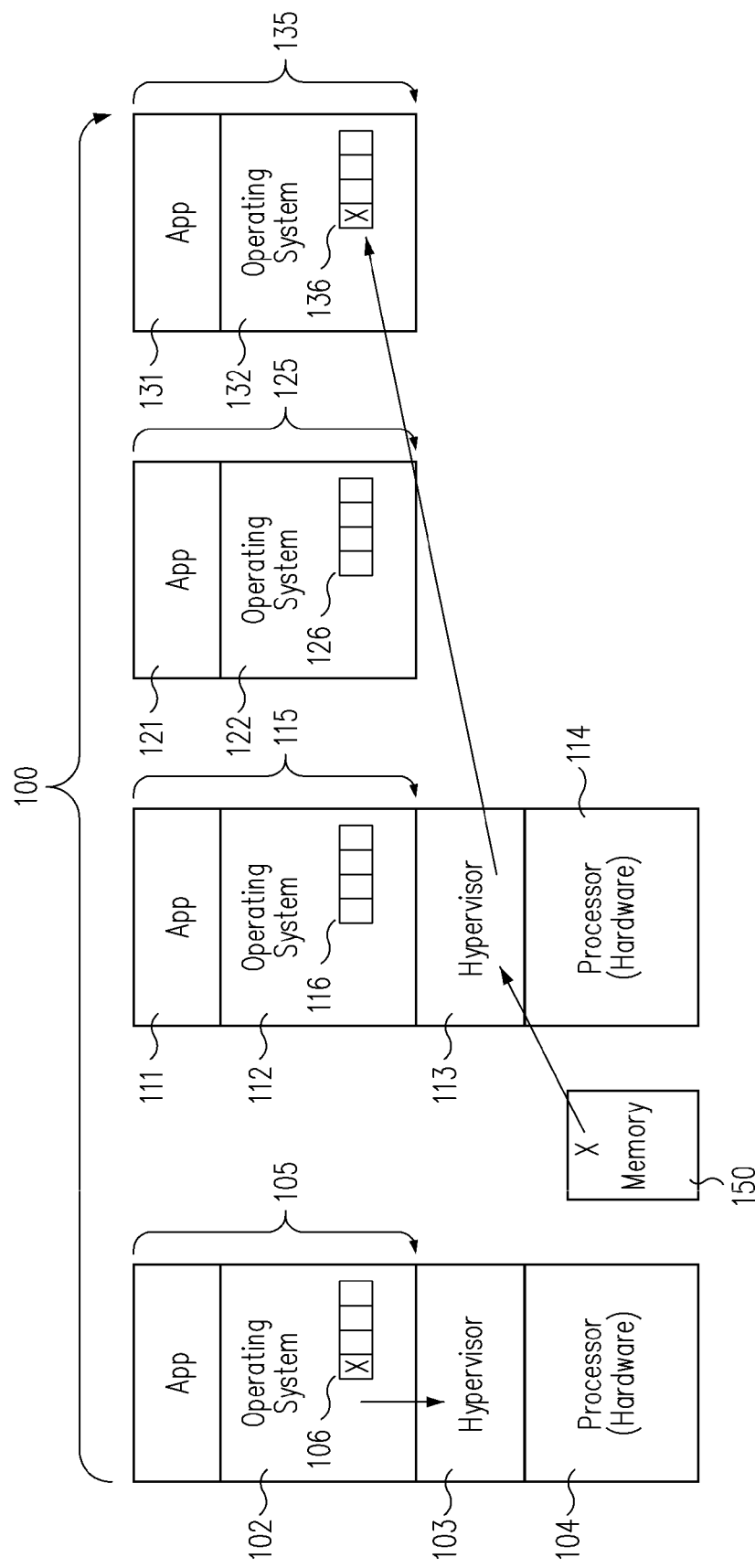
FIG. 1C is an illustration of the prior art system of FIGS. 1A and 1B, where the second hypervisor steals execution cycles for an executing virtual processor to write the message to a message queue in an inactive virtual processor.

As used in the following detailed description, an event queue (EQ) is a ring buffer in memory defined by a physical base address which is cache line aligned. An event queue has a size specified in cache lines, a head pointer, and a tail pointer.

As used in the following detailed description, an event queue write is a 64-byte write to memory which is caused by the reception of a message signaled interrupt or message from a PCI-Express bus.

As used in the following detailed description, a message is a type of PCI-Express command containing information which software needs. Messages serve many purposes and are used for INTx emulation, power management, hot plug, and other vendor specific purposes. In one embodiment, 256 different messages are supported. The messages are known to those of skill in the art and are detailed in PCI-Express Base Specification Revision 1.0a.

As used in the following detailed description, a message signaled interrupt (MSI) is a feature in PCI-Express that enables a device to request service by writing a system specified address with a memory write command. The memory write can be either a 32-bit or 64-bit address. In one embodiment, 256 different message signaled interrupts are supported. The message signaled interrupts are known to those of skill in the art and are detailed in PCI Specification 2.2.

As used in the following detailed description, an operating system interrupt mondo, sometimes called mondo, is an interrupt mechanism used to notify software about a hardware interrupt. The mechanism consists of an address and a data portion containing the target ID (TID) and the interrupt number offset (INO). In one embodiment, 64 operating interrupt mondos are available for support of the operating system.

As used in the following detailed description, a virtual processor is used to identify each strand in a processor. Each virtual processor corresponds to a specific strand on a specific physical core where there may be multiple physical cores, each with multiple strands. Each virtual processor has its own interrupt ID. At any given time, an operating system can have a different thread scheduled on each virtual processor.

As used in the following detailed description, a hyperprivileged processor state is the highest processor privilege state, in which all processor features are accessible.

As used in the following detailed description, hypervisor software is a layer of software that executes in the hyperprivileged processor state. In one embodiment, the hypervisor software (also referred to as "hypervisor") provides greater isolation between operating system ("supervisor") software and the underlying processor implementation.

As used in the following detailed description, a strand identifies the hardware state used to hold a software thread to execute that software thread. Strand is specifically the software-visible architected state (program counter (PC), next program counter (NPC), general-purpose registers, floating-point registers, condition codes, status registers, ASRs, etc.) of a thread and any microarchitecture state required by hardware for execution of the software thread.

DETAILED DESCRIPTION

In one embodiment of the present invention, a novel method is used to communicate information to an inactive virtual processor. Unlike the prior art methods, this method does not steal processing cycles, but does provide the virtual processor with the information so that when the virtual processor again becomes active the information is available.

In one embodiment, a system 200 (FIG. 2A) includes a plurality of processor cores including cores 204 and 214. For example, processor 200 is on a single chip and includes eight cores and each core includes four hardware threads (called strands). Hypervisor 203, 213 allows multiple operating systems, either different operating systems or different instances of the same operating system, to run on system 200 at the same time.

Figure 2A:
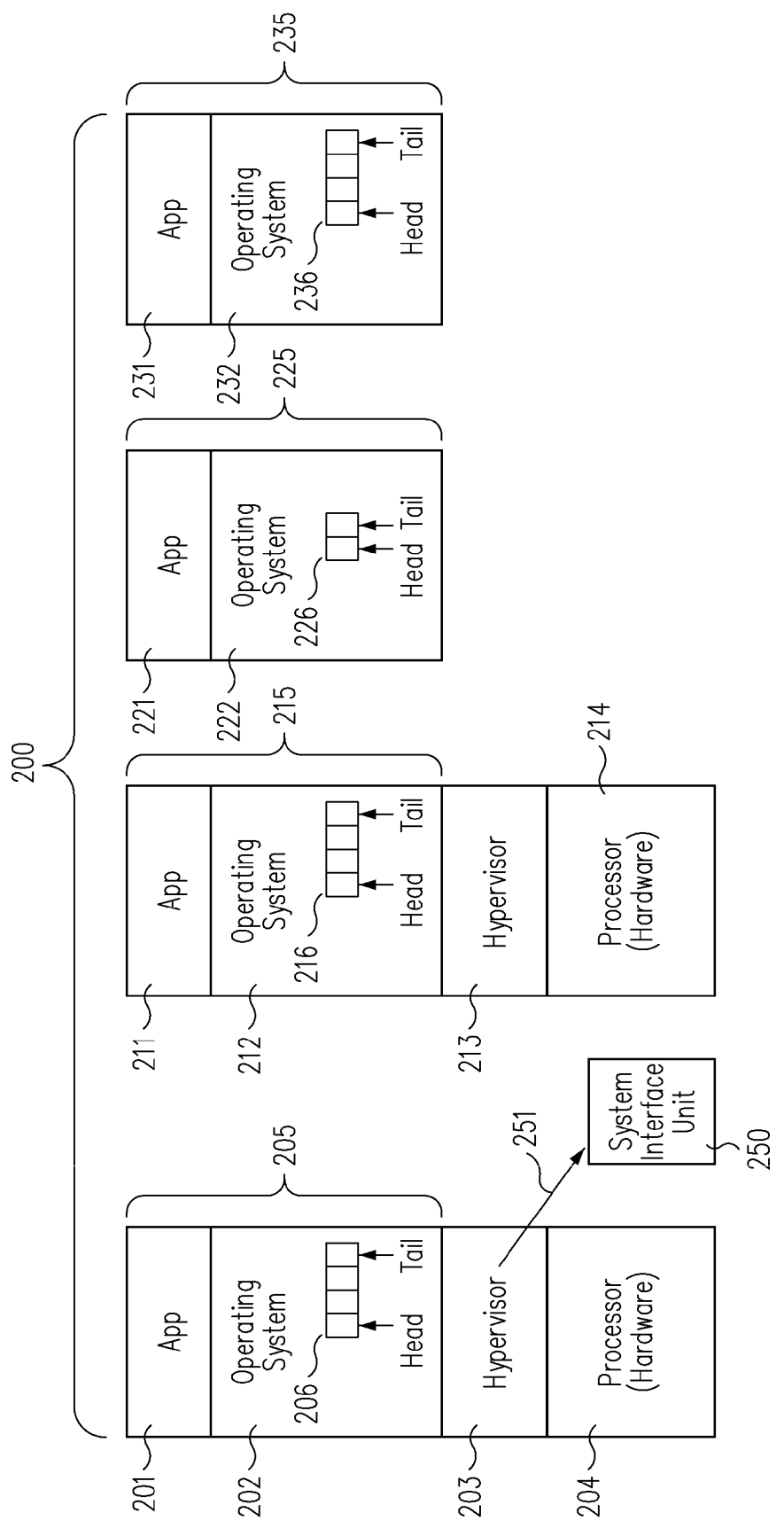
FIG. 2A is an illustration of one embodiment of a processor that includes a hardware system interface unit that is used to transfer a message to a virtual processor without using execution cycles by a hypervisor associated with the virtual processor.

In this example, four virtual processors 205, 215, 225, and 235 are illustrated. Virtual processor 205 includes application 201 and operating system 202; virtual processor 215 includes application 211 and operating system 212; virtual processor 225 includes application 221 and operating system 222; and virtual processor 235 includes application 231 and operating system 232. Virtual processors 225 and 235 are inactive as illustrated in FIG. 2A. Each virtual processor 205, 215, 225 and 235 identifies a different strand.

Each strand includes a message queue 206, 216, 226, and 236. Each of message queues 206, 216, 226, and 236 has a different head pointer and a different tail pointer. In one embodiment, the head pointer is stored in a register in the strand and the tail pointer is stored in another register in the strand.

Hardware structures, as described more completely below, in a system interface unit 250 handle the receiving of a message 251, such as a device interrupt. In one embodiment, three kinds of device interrupts from a PCI-Express bus—i) a message signaled interrupt, ii) a non-INTx message, and (iii) an INTx message—are handled by the hardware structures in system interface unit 250.

The use of hardware interrupts is illustrative only of one type of message and is not intended to limit the invention to messages associated with hardware interrupts. In view of this disclosure, one of skill in the art can implement the novel message handling system that minimizes stealing of hypervisor cycles to handle messages of interest.

Figure 2B:
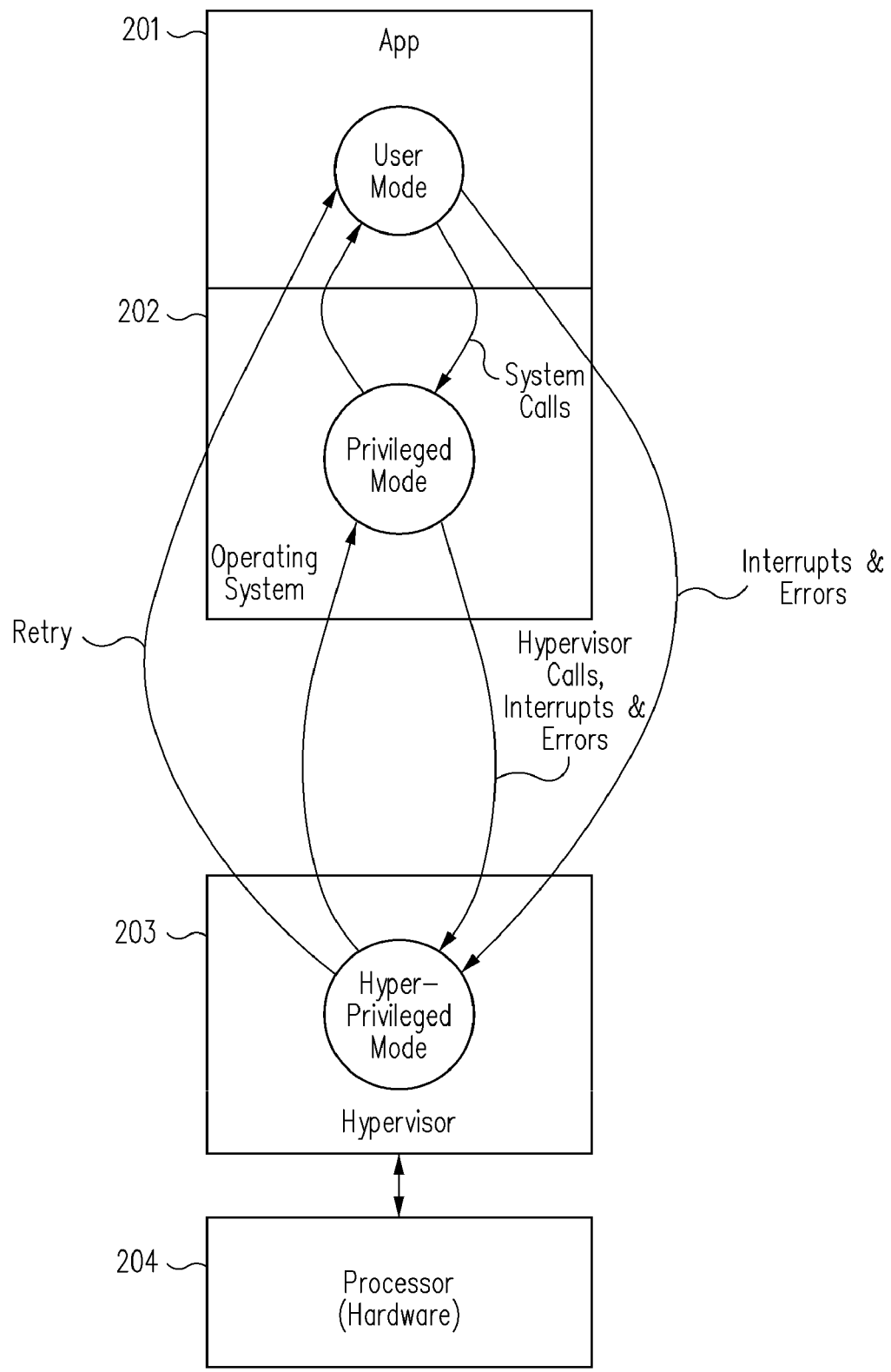
FIG. 2B is an illustration of one embodiment of the various execution modes associated with the processor of FIG. 2A.

FIG. 2B illustrates the various execution modes in this embodiment of the invention. Using virtual processor 205 as an example, application 201 executes in a user mode. In user mode, interrupts and errors are sent to hypervisor 203 that is executing in the hyperprivileged mode. Hypervisor 203 responds, as appropriate, with a retry command. Also, in user mode, systems calls are made to operating system 202 that is executing in a privileged mode. Operating system 202 responds to the system calls. Operating system 202, in privileged mode, sends hypervisor calls, interrupts, and errors to hypervisor 203 and receives responses as appropriate.

Figure 2C:
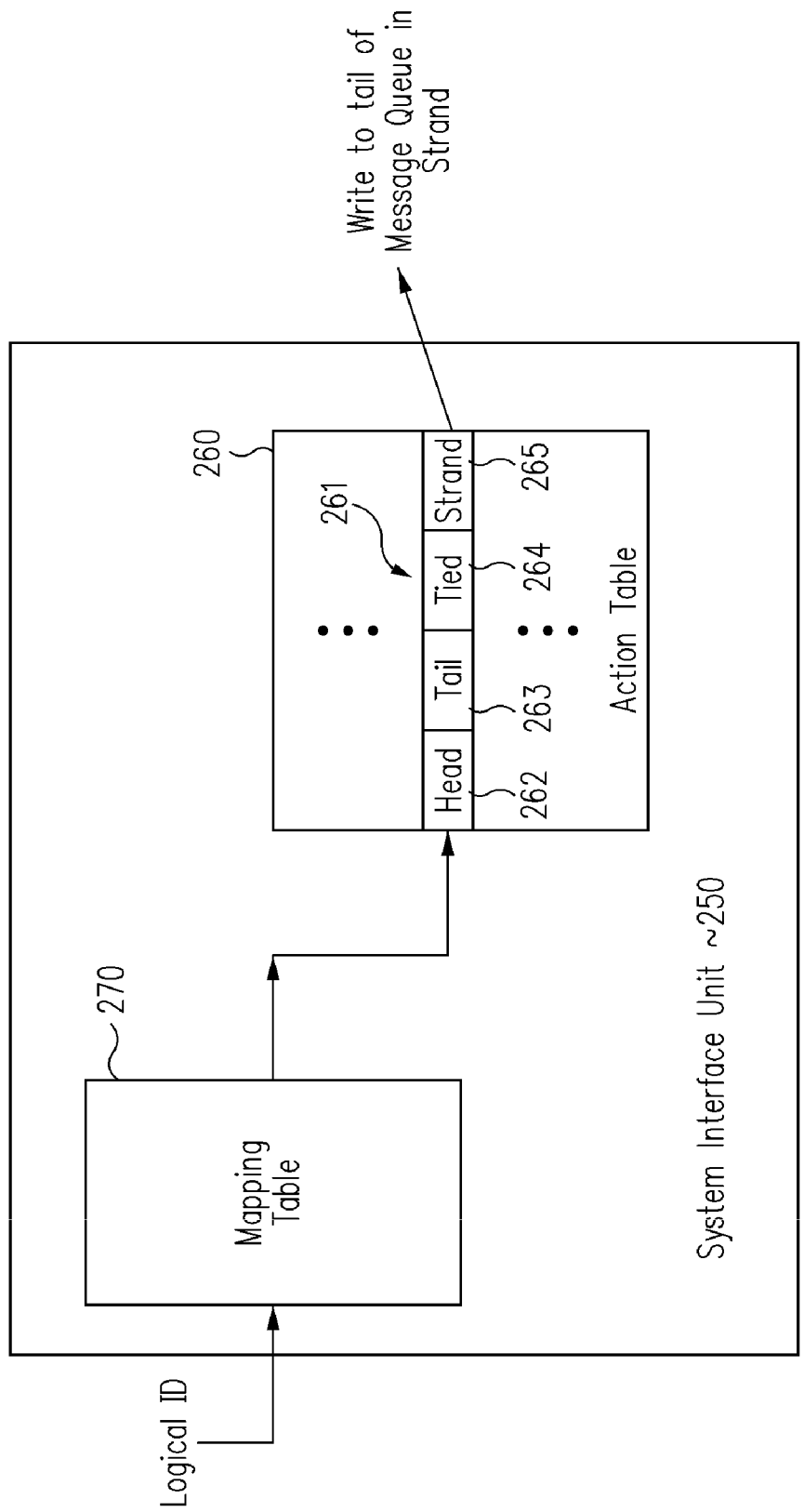
FIG. 2C is an illustration of tables used in the system interface unit of FIG. 2A in one embodiment.

In one embodiment, system interface unit 250 (FIGS. 2A and 2C) includes an action table 260. There is an entry 261, sometimes called a record, in action table 260 for each strand. Entry 261 includes a head pointer field 262 that stores a head pointer HEAD, a tail pointer field 263 that stores a tail pointer TAIL, an action field, which in this example stores a value of TIED, and a strand field 265 that stores a value STRAND that specifies the strand with which entry 261 is associated. In this embodiment, action table 260 is accessible by hyperprivileged address space identifiers (ASIs).

When action field 264 has a value of TIED, as in this example, the values in the head and tail pointer fields 262, 263 of action table 260 are tied to the head and tail pointer registers for the message queue, respectively, in the associated strand. Hardware keeps the values in the head and tail pointer fields of action table 260 consistent with the values in the head and tail pointer registers for the message queue in the associated strand, i.e., the strand indicated in strand field 265 of action table 260.

The head and tail pointer registers, in the strand, for the message queue are software accessible by privileged and hyperprivileged code. The tail pointer register for the message queue is read only in privileged mode.

When message 251 arrives, in one embodiment, processor 200 takes a hypervisor trap on a specified strand. Hypervisor 203 can then go read the appropriate memory queue and move the message into the message queue on the local strand or cross call to a hypervisor on the appropriate strand to receive the message.

For more efficient message handling, hypervisor 203 configures system interface unit 250 to directly deliver message 251 to the message queue in the privileged operating system, operating system 232 in this example, on the appropriate strand, (virtual processor 235) independent of whether the appropriate strand is active or inactive. In particular, the head and tail pointers for message queue 236 in strand 235 are tied to action table 260 as just described. (Since a virtual processor identifies a strand, as described above, for convenience the same reference numeral is used for the strand and the virtual processor.) This enables messages, such as interrupts from devices, to be delivered directly to the privileged level OS running on the strand without any additional hypervisor intervention. This eliminates any hypervisor overhead cost for I/O associated with handling the delivery of the message.

Figure 2D:
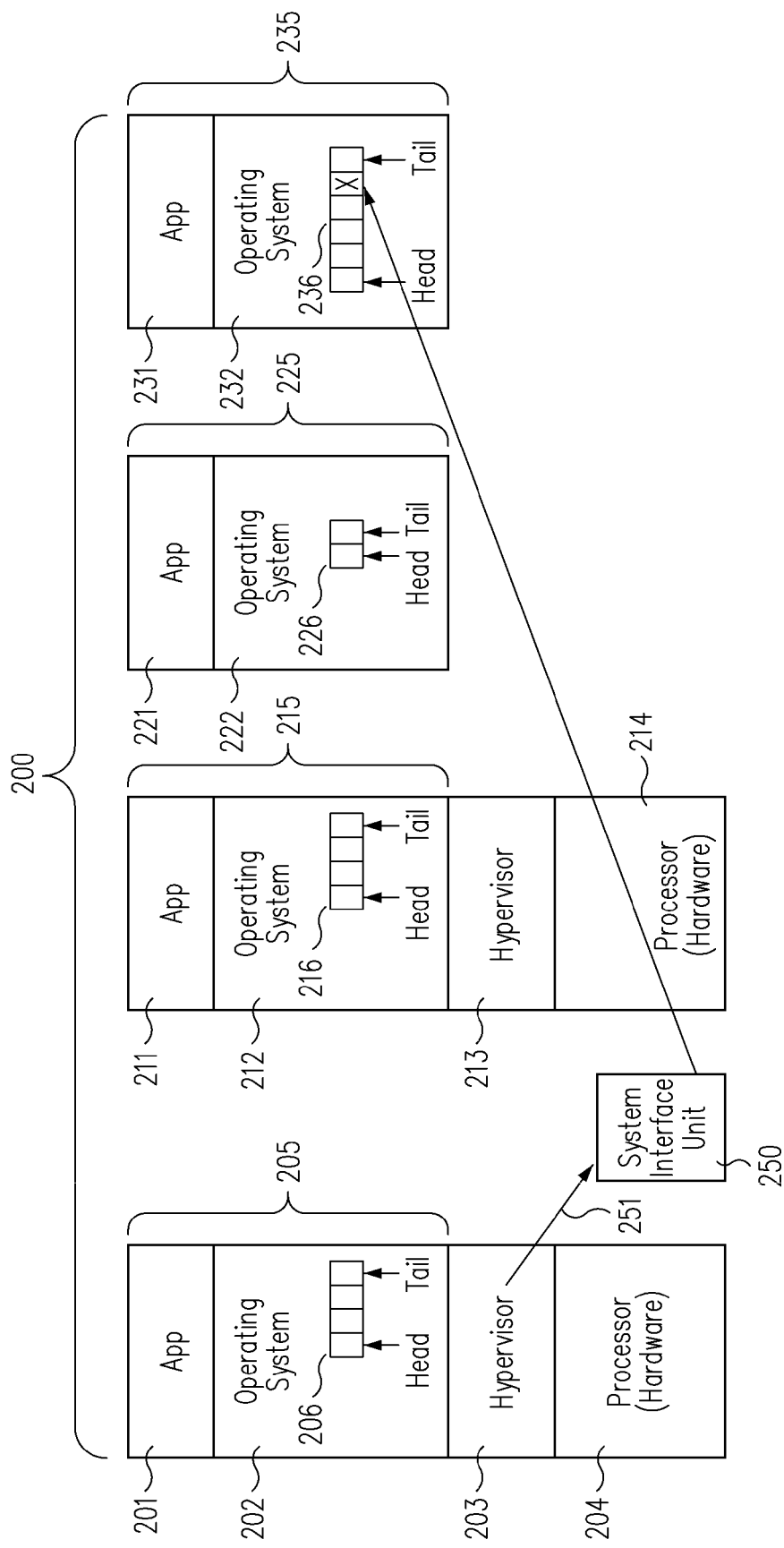
FIG. 2D is an illustration of one embodiment of the system interface unit of FIG. 2A delivering the message to a message queue associated with an inactive virtual processor and updating the message queue without using execution cycles by the hypervisor associated with the inactive virtual processor.

More particularly, a logical identifier (ID) associated with message 251 is used to select an entry in mapping table 270 that maps the logical ID to entry 261 in action table 260. Since values in the head and tail fields 262, 263 in action table 260 are tied to the registers, in strand 235, for the head and tail pointers, system interface unit 250 knows the location in the appropriate message queue to write the message and so writes the information to the tail position and updates the tail pointer in both action table 260 and the register for the tail pointer in strand 235 (FIG. 2D). Unlike the prior art that required hypervisor cycles to accomplish the message queue update, the message is delivered directly to the queue without any additional hypervisor intervention. When virtual processor 235 becomes active again, the message is available for processing.

In this embodiment, an example of an I/O bus is a PCI-express bus. As indicated above, several kinds of device interrupts from the PCI-Express bus are supported by processor 200:

(1) Message Signaled interrupt (MSI); and
(2) Message:
a) INTx message; and
b) non-INTx message.

Further, in this example, the following assumptions for device interrupt handling are made:

(1) There are no external interrupts, which are generated in response to signals on the pins of the chip of processor 200.
(2) There are no internal interrupts, which are generated internally by errors, events and performance requests, which occur within the processor 200. The internal errors are handled by error logging and reporting logic.
(3) Processor 200 does not have onboard interrupt (I2C interrupt).
(4) Messages which are processed followed by an event queue write are: ERR_COR, ERR_NON_FATAL, ERR_FATAL, PM_PME, PME_TO_Ack, and Attention_Button_Pressed.
(5) Messages which are processed and then consumed are: Assert_INTA, Assert_INTB, Assert_INTC, Assert_INTD, Deassert_INTA, Deassert_INTB, Deassert_INTC, and Deassert_INTD.
(6) Messages, which are not supported, include: Unlock, PM_Active_State_Nak, PME_Turn_Off, Set_Slot_Power_Limit, Attention_Indicator_On, Attention_Indicator_blink, Attention_Indicator_off, Power_Indicator_on, Power_Indicator_blink, Power_Indicator_off, and vendor specific messages.

Figure 3:
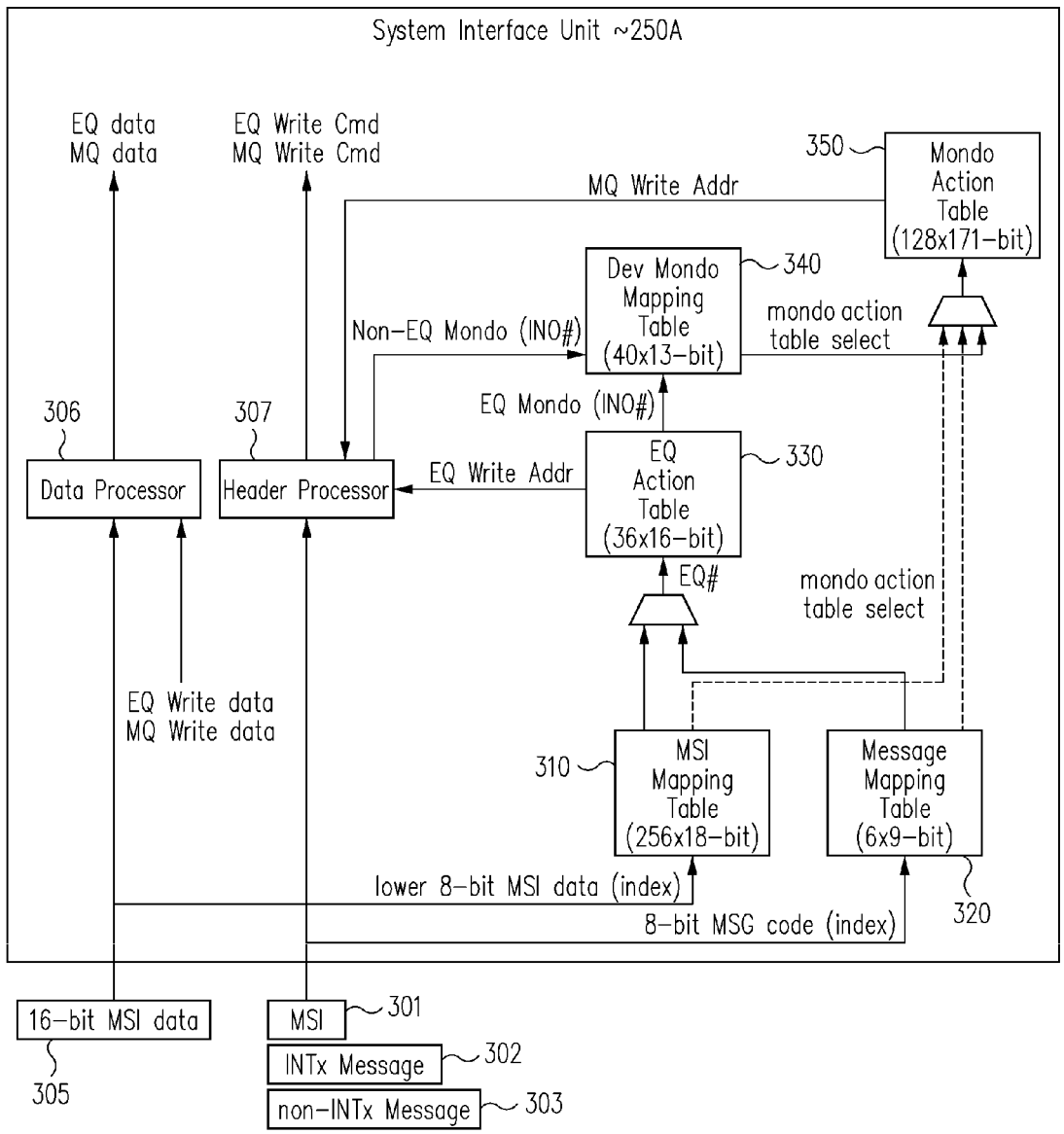
FIG. 3 is a more detailed illustration of one embodiment of the hardware system interface unit of FIG. 2A.

Also, as indicated above, hardware structures in system interface unit 250 handle receiving of device interrupts. FIG. 3 is a high-level block diagram showing the information flow and structure used in one embodiment of system interface unit 250A for handling device interrupts. FIG. 4 is a more detailed representation of the tables presented in FIG. 3. In FIG. 4, the table and field names are presented to assist in understanding. These names are not found in the tables of FIG. 3. In each case, the table is an array structure in memory, and the information in the various fields of the array structure is used as described more completely below.

In the embodiment of FIG. 3, device interrupts coming from the PCI-Express bus (not shown) include: message signaled interrupt 301, non-INTx message 302, and INTx message 303.

In one embodiment, two operation modes for each message signaled interrupt and non-INTx message are supported: a regular mode and an event queue write bypass mode.

Briefly, in regular mode, for both a message signaled interrupt 301 and a non-INTx message 303, an event queue write is triggered into the appropriate event queue and one device mondo queue write is triggered that inserts one corresponding device mondo into a memory-mapped device mondo queue in the appropriate strand. The device mondo queue is programmed to be in either idle, tied, or hypervisor mode, as explained more completely below.

In event queue write bypass mode, for message signaled interrupt 301 and non-INTx message 303, instead of triggering one event queue write and one device mondo queue write, the transaction bypasses lookups in event queue action table 330 and device mondo mapping table 340 and only a single device mondo queue write is inserted into the memory-mapped device mondo queue with combined event queue write and mondo queue write data. In this embodiment, the device mondo queue can only be programmed to tied mode in the event queue write bypass mode.

For INTx message 302, hardware 300 writes one device mondo into the device mondo queue.

Figure 5:
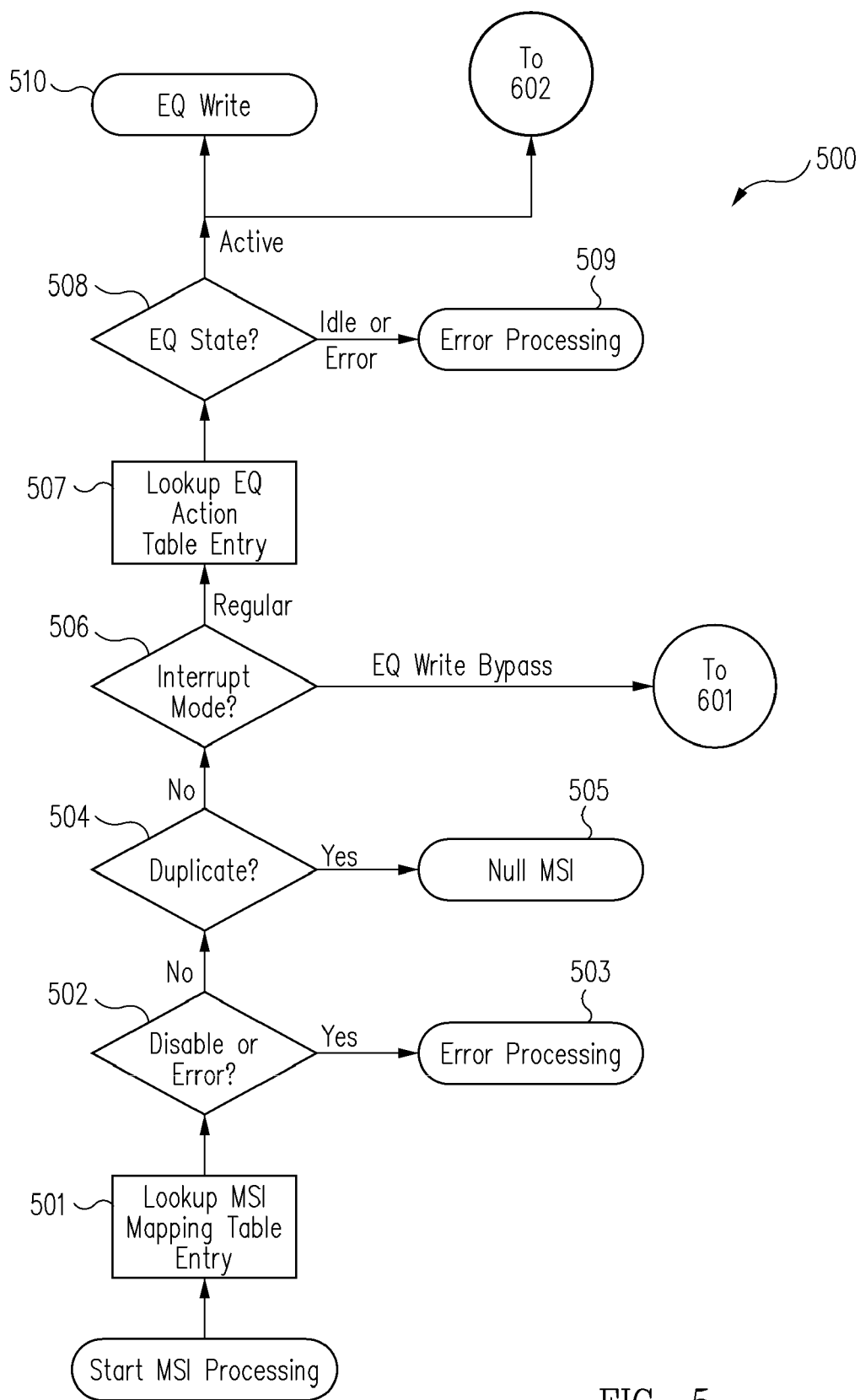
FIG. 5 is a process flow diagram for the hardware system interface unit of FIG. 3 used in processing a message signaled interrupt.

In this embodiment, as indicated above, processor 200 supports 256 message signaled interrupts (MSIs). Message signaled interrupt 301 is received with 16-bit message signaled interrupt data 305. In lookup operation MSI mapping table operation 501 in process 500 (FIG. 5), a lower 8-bits of message signaled interrupt data 305 is decoded to form an index, e.g., the logical ID discussed above, to message signaled interrupt mapping table 310 for event queue lookup. Table 1, below, presents one embodiment of an entry in MSI mapping table 310. (See also MSI mapping table 310A (FIG. 4).) In this embodiment, the width of each entry is 18 bits and so the size of table 310 is 256×18-bit. Table 310 includes valid, duplicate, target, mode and permission fields.

TABLE 1

Message Signaled interrupt Mapping Table Data Field

| Field | Width | Description |
|---|---|---|
| Valid | 1 | Indicate if this MSI is enabled |
| Duplicate | 1 | Indicate if this MSI is a duplicate MSI |
| Target | 7 | In regular mode,1'b0, target EQ number. In EQ write bypass mode, mondo action table select. |
| Interrupt Mode | 1 | 0: Regular mode 1: EQ write bypass mode |
| Permission | 8 | This permission code must be the same as 8-bit data in W1C ASI access to clear the duplicate bit. |

A specific message signaled interrupt can be enabled or disabled by the software by setting or clearing the valid field. For multiple same message signaled interrupts, e.g., the value in duplicate field is set, system interface unit 250A generates only one event queue write transaction or device mondo queue write transaction for these interrupts. A hyperprivileged ASI has access to each field in the data field of Table 1. A whole entry can be programmed by a hypervisor and the duplicate bit can be cleared by regular write-one to clear (WC1) address space identifier (ASI) with correct permission code after software completes servicing this message signaled interrupt.

Herein, when it is stated that software or code takes or does an action, operation, etc., those of skill in the art understand that this means that one or more computer instructions, in the software or code are executed and the result described is associated with that execution.

Thus, the index generated from the lower 8-bit MSI data selected one of the 256 entries in MSI mapping table 310. The data in that entry is then processed by hardware to determine if and how the message signaled interrupt should be processed by system interface unit 250A. Specifically, disabled or error check operation 502 determines whether the valid field in the selected entry of table 310 is set. If the valid field is not set, i.e., the message signaled interrupt is disabled, if there is a parity error in MSI data 305, or if MSI 301 is malformed, check operation 502 transfers to error processing 503 that in turn reports an error and nulls message signaled interrupt 301. Conversely, if the message signaled interrupt is enabled and has no error, check operation 502 transfers processing to duplicate MSI check operation 504.

Duplicate MSI check operation 504 determines whether the bit of the duplicate field in the selected entry of table 310 indicates that MSI 301 is a duplicate. If MSI 301 is a duplicate, duplicate check operation 504 transfers to null operation 505 that nulls MSI 301. Conversely, if MSI 301 is not a duplicate, duplicate MSI check operation 504 transfers processing to interrupt mode check operation 506.

Interrupt mode check operation 506 determines whether the interrupt mode field in the selected entry of table 310 is set to regular mode or event queue write bypass mode. If the mode field is set to regular mode, the value in the target field in the selected entry of table 310 is used to select an entry in event queue action table 330 (FIG. 3). Conversely, if the mode field is set to event queue write bypass mode, the value in the target field is a mondo action table select index that is used to select an entry in mondo action table 350.

Assuming the mode field is set to regular mode, interrupt mode check operation 506 transfers to look up event queue action table entry operation 507. Look up event queue action table entry operation 507 selects the entry in event queue action table 330 specified by the value in the target field in the selected entry of table 310.

Conversely, if the mode field is set to event queue write bypass mode, interrupt mode check operation 506 transfers to win arbitration check operation 614 (FIG. 6), which is described more completely below. The entry in mondo action table 350 associated with this MSI is specified by the value in the target field in the selected entry of table 310.

As indicated above, in one embodiment, processor 200 supports 36 event queues. Thus, for this embodiment, event queue action table 330 has 36 entries where each entry has a size of 16-bits and the size of table 330 is 36×16 bits. Table 2, below, presents one embodiment for an entry in event queue action table 330. (See also, event queue action table 330A in FIG. 4.) Table 330 includes state, head pointer and tail pointer fields.

TABLE 2

Event Queue Action Table Entry

| Field | Width | Description |
|---|---|---|
| State | 2 | State is one of idle, active, or error |
| Head Pointer | 7 | Head pointer of the Event Queue |
| Tail Pointer | 7 | Tail Pointer of the Event Queue |

In one embodiment, each field in an event queue action table entry can be accessed by a hyperprivileged ASI.

Figure 6:
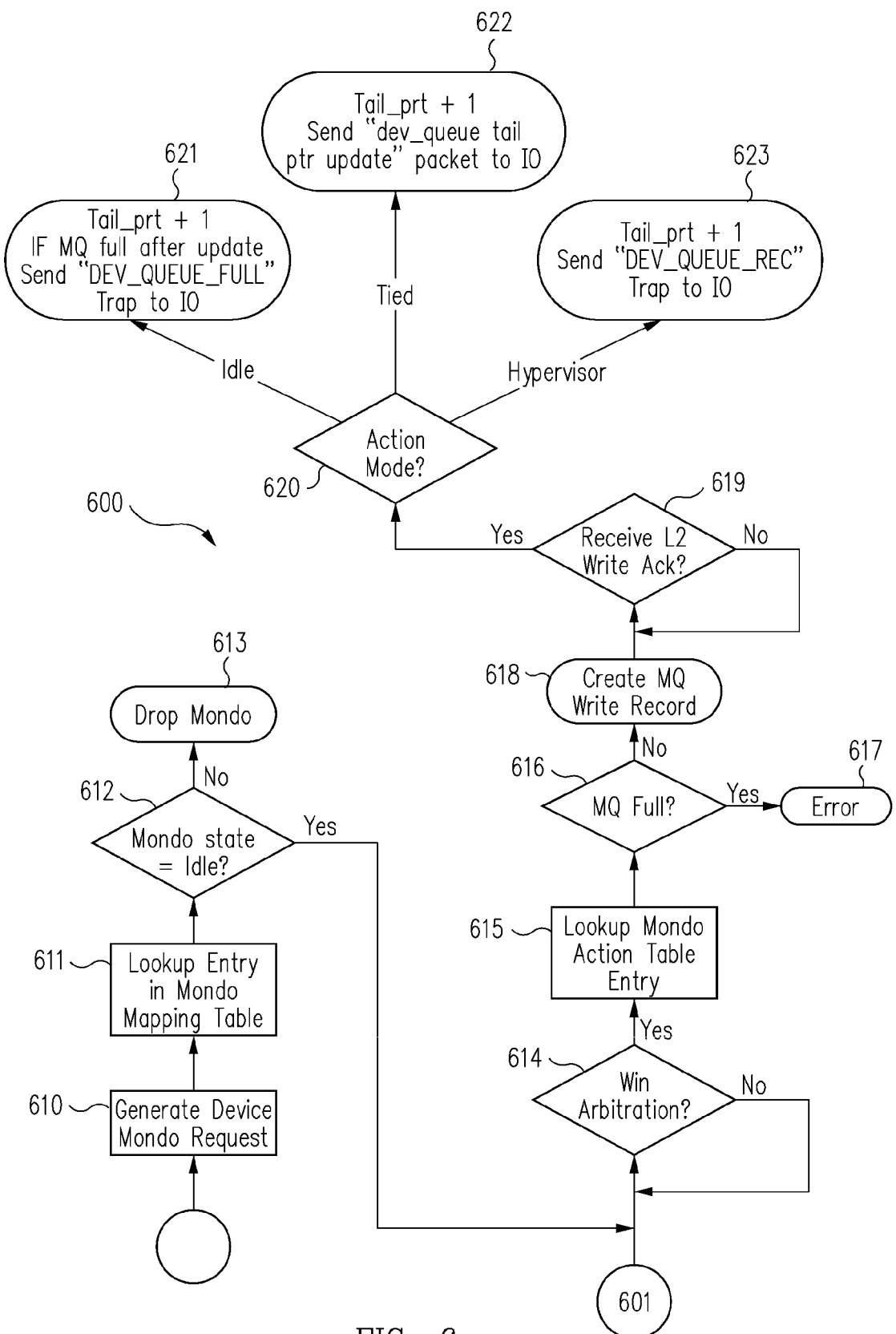
FIG. 6 is a process flow diagram for the hardware system interface unit of FIG. 3 used in processing a device mondo queue write.

Thus, when operation 507 transfers to event queue state check operation 508, the state field in the entry in event queue action table 330 selected by the event queue number in the target field of the entry selected in table 310 is analyzed. If the state is idle or error, check operation 508 transfers to error processing 509 that is similar to error processing 503 and so that description is incorporated herein by reference. Conversely, if the state is active, check operation 508 transfers to event queue write operation 510 and to generate device mondo request operation 610 (FIG. 6).

In event queue write Operation 510, an event queue write record and data is created and sent to IO via processors 306 and 307. Table 3 is one embodiment of an event queue write record and data.

TABLE 3

Event Queue Write record and data

| Word | Bit | Width | Field | Description |
|---|---|---|---|---|
| 0 | 63 | 1 | Reserved | Reserved.1'b0 |
| 0 | 62:56 | 7 | FMT/TYPE | Indicate 64/32 bit, MSI or Message |
| 0 | 55:46 | 10 | LENGTH | Set to length of data |
| 0 | 45:32 | 14 | ADDR[15:2] | Copy of VA[15:2] |
| 0 | 31:16 | 16 | RID | Requester Device ID |
| 0 | 15:0 | 16 | DATA | For MSI, MSIDATA [15:0] For Message, {8'b0, MSGCODE [7:0]} |
| 1 | 63:2 | 62 | ADDR[63:2] | Copy of VA[63:2] |
| 1 | 1:0 | 2 | RESERVED | Reserved. 2'b0 |

In one embodiment, each event queue contains 128 entries and the address of each of the first entries is 8K page aligned. There is one base address register used for the base address for all of the event queues.

An entry in an event queue is written by hardware using a tail pointer and is read by software using a head pointer. When the head pointer equals the tail pointer, the event queue is empty. When the tail pointer plus one equals the head pointer, the event queue is full. The hardware increments the value of the tail pointer before the event queue write has successfully completed. The software never updates the value of the tail pointer register except at initialization. The hardware never updates the value of the head pointer register. The value of the head pointer register is only updated by software ASI access after system software successfully reads one or more event queue records. As explained more completely below, for multiple event queue writes to the same event queue, only one device mondo is generated.

A device mondo request is created in generate device mondo request operation 610 (FIG. 6). In this embodiment, device mondos come from two sources: INTx messages and event queue writes. When system 200 receives a INTx message from the PCI-Express bus, a non-event queue device mondo is generated, as explained below. When there is difference between event queue head pointer and tail pointer, an event queue device mondo is generated. At operation 610, an EQ write and data record has been sent and so the device mondo request is generated in operation 610.

In this embodiment, processor 200 supports 64 mondos for PCI-Express bus interrupts. Table 4 is one embodiment of the INO mapping of the 64 interrupts.

TABLE 4

INO Mapping Table

| INO | Function |
|---|---|
| INO 0-19 | Reserved |
| INO 20-23 | 4 INTx emulation interrupts |
| INO 24-59 | 36 Event Queue interrupts |
| INO 60-61 | Reserved |
| INO 62-63 | Reserved |

Each mondo, i.e., each INO, has a corresponding entry in device mondo mapping table 340. Thus, in operation 611, system interface unit 250A uses the INO associated with the event queue to access device mondo mapping table 340

In this embodiment, device mondo mapping table 340 has forty-entries that map each device mondo INO 20-59 to specific entries in mondo action table 350. When there is need for a device mondo, the INO of the device mondo is looked up in the device mondo mapping table 340 by hardware, e.g., in operation 611.

In this embodiment, each of the forty entries in device mondo mapping table 340 has a size of 13-bits and the size of table 340 is 40×13 bits. Table 5, below, presents one embodiment for an entry in device mondo mapping table 340. (See also, device mondo mapping table 340A in FIG. 4.) Table 340 includes valid, state, group controller number, mode and select fields.

TABLE 5

Definition of Entry in:Device Mondo Mapping Table 340

| Field | Width | Description |
|---|---|---|
| Valid | 1 | 1: Mondo valid 0: Mondo Invalid |
| State | 2 | State: idle, received, or pending |
| Group | 2 | Group controller number. |
| Mode | 1 | 0: EQ mondo 1: Non-EQ mondo. |
| Select | 7 | The select field specifies which Mondo Action Table entry is to be used for handling this device mondo. |

Mondo Device Mapping Table 340 is Accessible by Hyperprivileged ASI Accesses.

In lookup entry in device mondo mapping table operation 611, the entry corresponding to the INO is accessed. Mondo state check operation 612 first determines whether the mondo is valid and then determines the state of the mondo from the entry in device mondo mapping table 340. If the mondo state is other than idle, the device mondo is dropped because this means that another device mondo for this INO has been generated and is being processed. Since only one device mondo is permitted in this embodiment, this device mondo is dropped in drop mondo operation 613. Conversely, if the mondo state is idle, processing transfers 601 from mondo state check operation 612 to win arbitration check operation 614.

In one embodiment, all received mondos go through the arbitration based on a group number and interrupt priority. When the current event queue mondo wins the arbitration, win arbitration check operation 614 transfers processing to lookup mondo action table entry 615. The winner, as described more completely below, is sent to the target core via a device mondo queue write transaction.

The entry accessed in mondo action table 350 is determined by the value in the select field of the entry in device mondo mapping table 340. Mondo action table 350 is one embodiment of action table 260. Mondo action table 350 specifies how to handle a device mondo. In this embodiment, mondo action table 350 has 128 entries. The entries specify the memory-mapped device mondo queue as well as how to inform the processor that the mondo has arrived.

Table 6, below, presents one embodiment for an entry in mondo action table 350. (See also, mondo action table 350A in FIG. 4.) Each entry in table 350 includes six fields: base, size, head, tail, action, and strand.

TABLE 6

Definition of Entry in Mondo Action Table 350

| Field | Width | Description |
|---|---|---|
| Base | 64 | 64-bit physical address that points to the base of the memory queue to be updated |
| Size | 64 | 64-bit address mask used for pointer manipulation |
| Head | 64 | 64-bit queue head pointer |
| Tail | 64 | 64-bit queue tail pointer |
| Action | 2 | specify the action to be taken after the mondo is copied into memory. |
| Strand | 5 | specify the strand associated with this entry. |

Mondo Action Table 350 is Accessible by Hyperprivileged ASIs.

In one embodiment, the lower 6-bits of the address in the base field are hardwired to zero. Similarly, the lower 6-bits in the size field are hardwired to zero. The value of the size field is bit-wise ANDed with the queue tail pointer.

The pointer in the head field corresponds to the value in the head pointer register in the corresponding strand. In this embodiment, the pointer in the head field is equal to the value in the head pointer register in the corresponding strand if this entry is tied to a strand. The head field is never updated by system interface unit 250A.

The pointer in the tail field corresponds to the value in the tail pointer register in the corresponding strand. In this embodiment, the pointer in the tail field is equal to the value in the tail pointer register in the corresponding strand if this entry is tied to a strand. System interface unit 250A is responsible for increasing the tail pointer by one after the mondo data has been written into the memory-mapped device mondo queue via data processor 306. In tied mode, system interface unit 250A also needs to update the tail pointer register in the strand after the tail pointer value in table 350 is updated. The value of the tail field, ANDed with value in the Size field and ORed with the value in the Base field produces the address that a mondo should be written into and is provided to header processor 307.

The action field is a 2-bit field to specify the action to be taken after the mondo is copied into memory. One embodiment of an implementation of the 2-bit field is presented in Table 7.

TABLE 7

| Value in Action Field | Action to be Taken |
|---|---|
| 00 (Idle) | If queue not full after update, do nothing. If the-device mondo queue is full after update, send hyperprivileged DEV_QUEUE_FULL trap to strand specified in STRAND field. |
| 10 (Tied to device mondo queue) | This entry is tied to the device mondo queue of the strand specified in the STRAND field. The values in the head and tail fields are kept consistent with the values in the device mondo queue head pointer and device mondo queue tail pointer registers on the strand. Updating the tail pointer causes a privilege trap on the corresponding strand |
| 11 (hypervisor management mode) | After updating the device mono queue in memory, send a hyperprivileged DEV_QUEUE_REC trap to the strand specified by the STRAND field |

The Value in the Strand Field Specifies the Strand Associated with this Entry of Table 350.

Upon completion of operation 615, device mondo queue full check operation 616 determines whether the device mondo queue for the target strand is full. If the device mondo queue is full, check operation 616 transfers processing to error operation 617 that in turn generates an error. Conversely, if the device mondo queue is not full, processing transfers from chock operation 616 to create mondo queue write record operation 618.

Operation 618 determines whether the interrupt mode is the regular mode or the event queue write bypass mode. The device mondo write record and data generated is different for the two modes. Thus, operation 618 generates an appropriate device mondo write record and sends that record to IO. Table 8 is one embodiment of a device mondo write record in the regular mode. Table 9 is one embodiment of a device mondo write record in the event queue write bypass mode.

TABLE 8

Device Mondo Write Record and data (In Regular Mode)

| Word | Bit | Width | Field | Description |
|---|---|---|---|---|
| 0 | 63 | 1 | Mode | 1: EQ Mondo, 0: non-EQ mondo |
| 0 | 62:11 | 52 | Reserved | 52'b0 |
| 0 | 10:5 | 6 | INO | Mondo INO number |
| 0 | 4:0 | 5 | Target ID | Target{core_id[1:0], ucore id[1:0], stand_id} |
| 1 | 63:0 | 64 | Data | Software programmable |

TABLE 9

Device Mondo Write Record-and data (In EQ write bypass Mode)

| Word | Bit | Width | Field | Description |
|---|---|---|---|---|
| 0 | 63 | 1 | Mode | 1: EQ Mondo, 0: non-EQ mondo |
| 0 | 62:5 | 58 | Reserved | 58'b0 |
| 0 | 4:0 | 5 | Target ID | Target{core_id[1:0], ucore_id[1:0], stand_ id} |
| 1 | 63:0 | 64 | Data | Software programmable |
| 2 | 63 | 1 | Reserved | 1'b0 |
| 2 | 62:56 | 7 | Fmt/Type | Indicate 64/32-bit, MSI or Message |
| 2 | 55:46 | 10 | Length | Set to length of the data |
| 2 | 45:32 | 14 | Addr[15:2] | Copy of VA[15:2] |
| 2 | 31:16 | 16 | RID | Requester Device ID |
| 2 | 15:0 | 16 | Data | For MSI, MSIDATA[15:0] For Message, {8'b0, MSGCODE[7:0]} |
| 3 | 63:2 | 62 | Addr[63:2] | Copy of VA[63:2] |
| 3 | 1:0 | 2 | Reserved | Reserved 2'b0 |

After operation 618 sends the device mondo write record and data to IO, receive L2 cache write acknowledge check operation 619 idles until the acknowledgement is received and then transfers processing to action mode check operation 620.

Action mode check operation 620, in this embodiment, determines whether the action mode is (i) idle, (ii) tied, or (iii) hypervisor and transfers to the corresponding operation 621, 622, and 623, respectively.

In the idle mode, operation 621 increments the value of the tail pointer. Also, if the device mondo queue is full after the update, operation 621 sends a device queue full trap to IO.

In the tied mode, operation 622 increments the value of the tail pointer. Also, operation 622 sends a device queue tail pointer update packet to IO.

In the hypervisor mode, operation 623 increments the value of the tail pointer. Also, operation 621 sends a device queue record trap to IO.

The above description was associated with processing a message signaled interrupt. As indicated above, message interrupts, sometimes called messages, are also processed. In this embodiment, as indicated above, processor 200 supports INTx message 302 and Non-INTx message 303.

Figure 7:
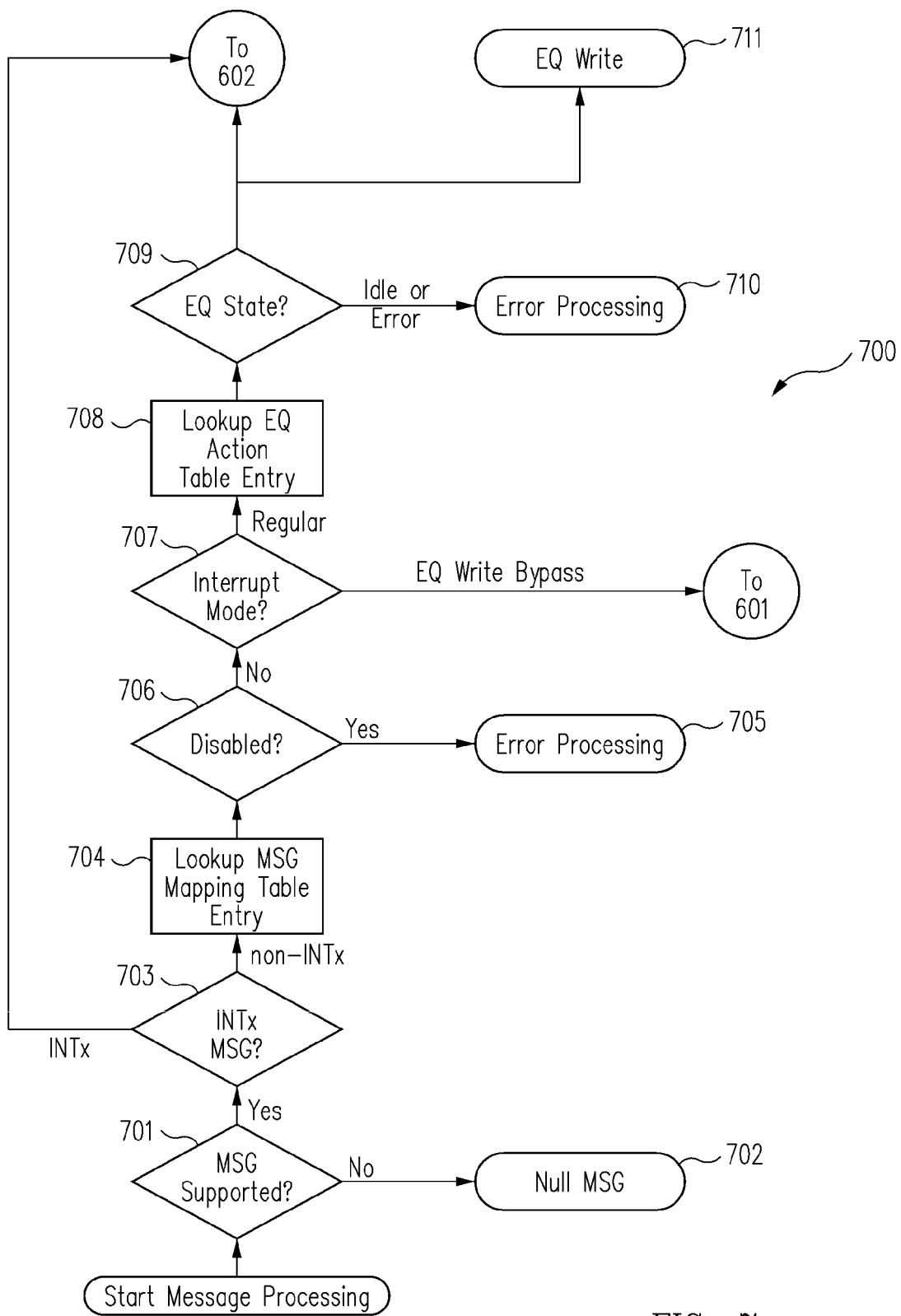
FIG. 7 is a process flow diagram for the hardware system interface unit of FIG. 3 used in processing non-INTx and INTx messages.

When a message interrupt is received, message supported check operation 701 in process 700 (FIG. 7) determines whether the message is supported. As explained above, in one embodiment, the non-INTx messages supported include ERR_COR, ERR_NON_FATAL, ERR_FATAL, PM_PME, PME_TO_Ack, and Attention_Button_Pressed. The INTx messages supported include Assert_INTA, Assert_INTB, Assert_INTC, Assert_INTD, Deassert_INTA, Deassert_INTB, Deassert_INTC, and Deassert_INTD.

The messages, which are not supported, include: Unlock, PM_Active_State_Nak, PME_Turn_Off, Set_Slot_Power_Limit, Attention_Indicator_On, Attention_Indicator_blink, Attention_Indicator_off, Power_Indicator_on, Power_Indicator_blink, Power_Indicator_off, and vendor specific messages. The messages used in this embodiment are illustrative only and are not intended to limit the invention to only these specific messages. In view of this disclosure, one of skill in the art can defined the appropriate messages for a particular application of the invention.

If the message is one of the INTx messages or one of the non-INTx messages that are supported, message supported check operation 701 transfers processing to interrupt message check operation 703 and otherwise to null message operation 702 that in turn nulls the message.

Interrupt message check operation 703 determines whether the interrupt message is an INTx message or a non-INTx message. If the message is an INTx message, check operation 703 transfers processing to win arbitration check operation 614 (FIG. 6). The processing in operation 614 and the subsequent operations 615 to 623 were described above and that description is incorporated herein by reference. If the message is a non-INTx message, check operation 703 transfers processing to lookup message mapping table entry operation 704.

In lookup message mapping table entry operation 704, a lower 8-bits of message interrupt data is decoded to form an index to message interrupt mapping table 320 for event queue lookup. Table 10, below, presents one embodiment of an entry in message mapping table 320. (See also message mapping table 320A (FIG. 4).) In this embodiment, the width of each entry is 9 bits and so the size of table 320 is 6×9-bit. Table 320 includes valid, target, and mode fields. A specific message can be enabled or disabled by a software instruction that configures the valid field. The whole entry can be configured by a hypervisor.

TABLE 10

Message Mapping Table Record

| Field | Width | Description |
| --- | --- | --- |
| Valid | 1 | Message is enabled or not-enabled |
| Target | 7 | In regular mode, 1b0, target EQ number. In EQ write bypass mode, mondo action table select. |
| Mode | 1 | 0: Regular mode 1: EQ write bypass mode |

Thus, the index generated from the lower 8-bit message data, selected one of the six entries in message mapping table 320. The date in that entry is then processed by hardware to determine if and how the message interrupt should be processed by system interface unit 250A. Specifically, disabled check operation 706 determines whether the valid field in the selected entry of table 320 is set. If the valid field is not set, i.e., the message interrupt is disabled, check operation 706 transfers to error processing 705 that in turn reports an error and nulls the non-INTx message 303. Conversely, if the non-INTx message interrupt is enabled, check operation 706 transfers processing to interrupt mode check operation 707.

Interrupt mode check operation 707 determines whether the mode field in the selected entry of table 320 is set to regular mode or event queue write bypass mode. If the mode field is set to regular mode, the number in the target field in the selected entry in table 320 is used to select an entry in event queue action table 330 (FIG. 3). Conversely, if the mode field is set to event queue write bypass mode, the value in the target field is a mondo action table select that selects an entry in mondo action table 350.

Assuming the mode field is set to regular mode, interrupt mode check operation 707 transfers to look up event queue action table entry operation 708. Look up event queue action table entry operation 708 selects the entry in event queue action table 330 specified by the value in the target field in the selected, entry, of table 310.

Conversely, if the mode field is set to event queue write bypass mode, interrupt mode check operation 707 transfers to win arbitration check operation 614 (FIG. 6), which was described above. The entry in mondo action table 350 associated with this MSI is specified by the value in the target field in the selected entry of table 310.

As indicated above, in one embodiment, processor 200 supports 36 event queues. Thus, for this embodiment, event queue action table 330 (See also, table 330A (FIG. 4).) has 36 entries where each entry has a size of 16-bits and the size of table 330 is 36×16 bits. Table 2, above, presents one embodiment for an entry in event queue action table 330.

Thus, when operation 708 transfers to event queue state check operation 709, the state field in the entry in event queue action table 330 selected by the event queue number in the target field of the entry selected in table 330 is analyzed. If the state is idle or error, check operation 708 transfers to error processing 710 that is similar to error processing 705 and so that description is incorporated herein by reference. Conversely, if the state is active, check operation 709 transfers to event queue write operation 711 and to generate device mondo request operation 610.

In event queue write operation 711, an event queue write record and data is created and sent to IO. Table 3 is one embodiment of an event queue write record and data. The operations that follow operation 610 are the same as those described above with respect to FIG. 6 and that description is incorporated herein by reference.

As explained above, each strand has a device mondo queue head pointer register and a device mondo queue tail pointer register. For more efficient device mondo handling, the hypervisor configures system interface unit 250A to directly deliver a device mondo to the privileged OS on the appropriate strand. On the strand side there is an additional mondo table index register that is set to the index of the corresponding entry in mondo action table 350.

As described above, tying a mondo action table entry to a strand enables mondos from devices to be delivered directly to the privileged level OS running on the strand without any additional hypervisor intervention. Therefore eliminating any hypervisor overhead cost for I/O associated with delivering the mondo directly to the strand.

The mondo table index register is a hyperprivileged register used to configure the device mondo queue registers to be coherently coupled to mondo action table 350. The mondo table index register is per strand.

Table 11, below, presents one embodiment of fields in the mondo table index register for device mondos.

TABLE 11

Mondo Table Index Register Fields

| Bit | Field | Description |
|---|---|---|
| 31:16 | Not used | Not used for Device Mondos |
| 15 | D | Tie device mondo queue mondo action table. 1 = Tied, 0 = decoupled |
| 6:0 | Device Mondo Index | Entry in the mondo action table to tie the device mondo queue head pointer and tail pointer to |

To provide predictable behavior in the delivery of messages such as device mondos, in one embodiment, access restrictions are implemented. The device mondo queue tail pointer register is never written by a hypervisor if an entry in the mondo action table is currently tied to the strand. The mondo action table is first updated to break the connection. Also, the base, size and tail fields of the mondo action table are not written by the hypervisor when the table entry may be used by hardware.

When tying a mondo action table entry to a strand:
make sure the mondo action table entry is not to be used (not targeted by an entry in the device mondo mapping table 340);
set the field STRAND in the mondo action table to point to the strand and set the action field to 10;
set the entries in fields base and size in the mondo action table;
set the mondo table index register on the strand to specify the entry in the mondo action table;
write the device mondo queue head pointer register on the strand with the appropriate value, this will update the table entry as well;
write the device mondo tail pointer register with the appropriate value; and
write the corresponding tail pointer field in the mondo action table with the same value.

Upon completion of these operations, the device mapping table can be configured to use the entry in the mondo action table.

When untying a mondo action table entry:
optionally make sure the table entry is not to be used (not targeted by device mondo mapping table 340);
set the entry in the action field to other than 10;
set the mondo table index register on the strand to 0xffffffffffffffff; and
reconfigure other fields in the entry in the mondo action table as appropriate.

To send a mondo by a strand, the 64-byte block of data to be sent resides in a 64-byte aligned location in memory. A special hyperprivileged store to the SEND_MONDO ASI specifies the target of the mondo as well as the physical address in memory where the mondo data resides. This store triggers the hardware to read the 64-byte block of data in memory and to generate and send a mondo to the specified target as described above. In the embodiment described above, one outstanding mondo from a strand is supported. However, in other embodiments, more than one outstanding mondo from a strand could be supported.

Thus, to send a mondo the SEND_MONDO ASI is used. This is a write only ASI that can is used with a STXA instruction. The 64-bit data value written specifies the starting address (physical address) of the mondo data in memory. The address used for the store instruction specifies the target of the mondo. Table 12 is one embodiment of the fields in the address of SEND_MONDO, while Table 13 is one embodiment of the fields in the data of SEND_MONDO.

TABLE 12

Address of SEND_MONDO Fields

| Bit | Field | Description |
|---|---|---|
| 63:25 | — | Reserved |
| 24 | D | Device A 1 indicates the mondo is targeted to a device mondo queue. |
| 23:8 | Target | 16-bit target interrupt ID |
| 7:3 | (BN pair) | In correct embodiment only one outstanding mondo is supported and so this field is zero. In other embodiments, this Field is used to spedify the busy/nack pair. |
| 2:0 | — | Set to 0. 3'b0 |

TABLE 13

Data of SEND_MONDO Fields

| Bit | Field | Description |
|---|---|---|
| 63:6 | Address | Physical Address of Mondo Data |
| 5:0 | — | Set to zero. 6'b0 |

A mondo dispatch status register provides the status of the last sent mondo. A busy/nack pair of bits indicates the status. Table 14 is one embodiment of the fields in the mondo status dispatch register.

TABLE 14

Fields of mondo status dispatch register

| Bit | Field | Description |
|---|---|---|
| 63:2 | — | Reserved |
| 1 | Nack | Cleared when a new mondo is sent. Set if a mondo is nacked by the destination. |
| 0 | Busy | Set when a new mondo is sent. Cleared when the mondo is successfully sent or when a mondo is nacked. |

In one embodiment, processor 200 with system interface unit 250 is included in a hardware configuration 810 like a personal computer or workstation so that configuration 810 includes system interface unit 250C. In this embodiment, the applications, operating system(s), and hypervisor(s) are included in memory 812 or a memory coupled to processor 200C via the Internet for example. Hardware configuration 810 includes, but is not limited to, an I/O interface 814, a display 816, a keyboard 815, and a mouse 818.

However, in another embodiment, system 810 is part of a client-server computer system 800. In this embodiment, server system 880 includes a processor 200D with system interface unit 250D as well as a display 881, memory 884, and a network interface 883. In one embodiment, system 880 essentially is processor 200D with system interface unit 250D.

Figure 8:
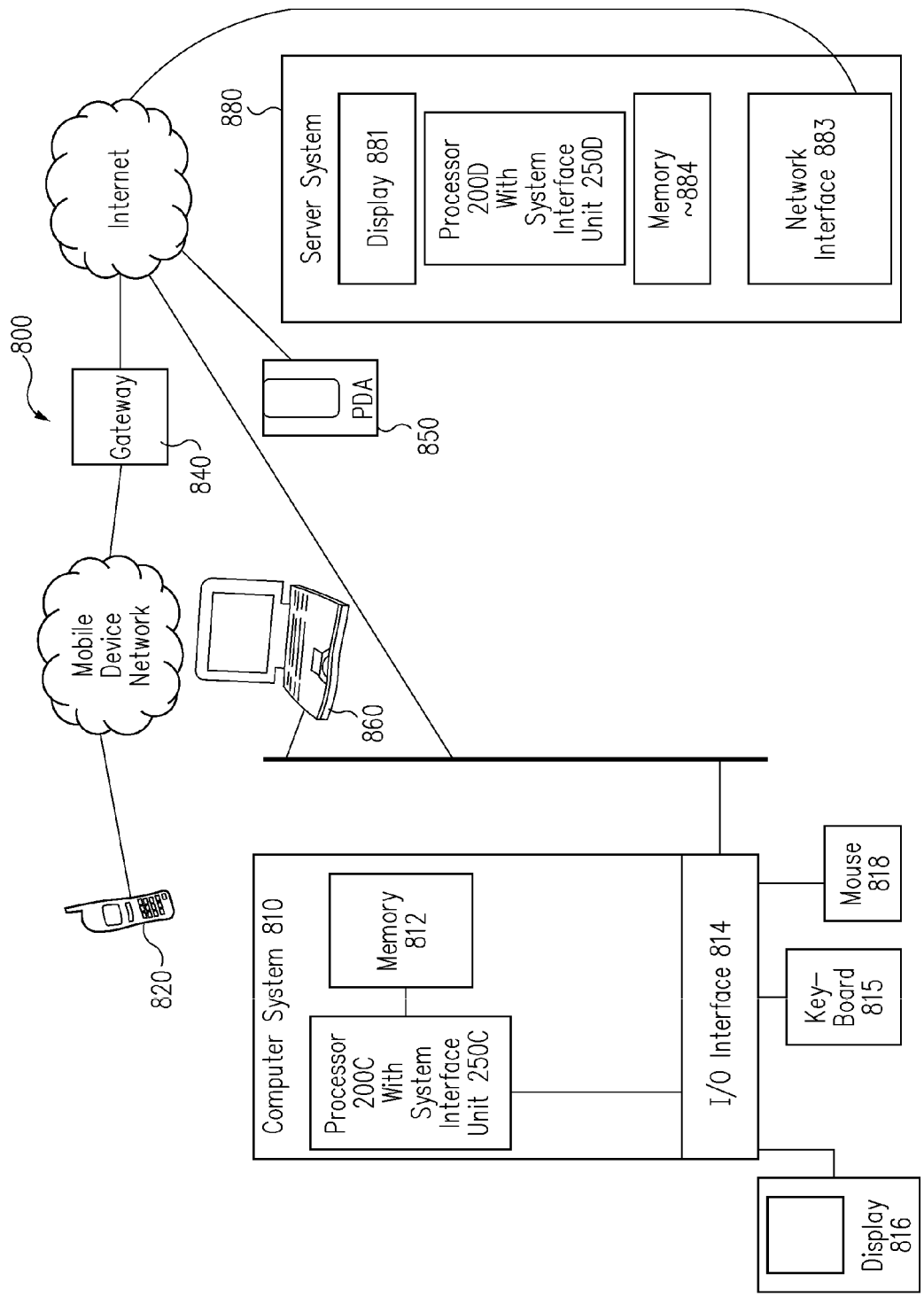
FIG. 8 is an illustration of various systems that include the processor of FIG. 2A.

For either a client-server computer system 800 or a stand-alone computer system 810, memory 812 typically includes both volatile memory, such as main memory, and non-volatile memory, such as hard disk drives. While memory 812 is illustrated as a unified structure in FIG. 8, this should not be interpreted as requiring that all memory in memory 812 is at the same physical location. All or part of memory 812 can be in a different physical location than processor 200C.

More specifically, processor 200 with system interface unit 250, in one embodiment, can be included in a portable computer 860, a workstation 810, a server computer 880, or any other device 820, 840, 850. Similarly, in another embodiment, system 800 can be comprised of multiple different computers, wireless devices, server computers, or any desired combination of these devices that are interconnected to perform the operations, as described herein.

Herein, a computer memory refers to a volatile memory, a non-volatile memory, or a combination of the two. Similarly, a computer keyboard input unit 815 and a display unit 816 refer to the features providing the required functionality to input the information described herein, and to display the information described herein, respectively, in any one of the aforementioned or equivalent devices.

While the message management hereinbefore has been explained in connection with one embodiment thereof, those skilled in the art will readily recognize that modifications can be made to this embodiment without departing from the spirit and scope of the present invention.

We claim:

1. A computer-based method comprising:
configuring a hardware circuit to transfer a message to a message queue in an operating system; and
using said hardware circuit to transfer a message to said message queue in said operating system without requiring use of either said operating system or a hypervisor associated with said operating system, including
receiving a message having a logical identifier,
selecting a mapping table entry in a mapping table, said mapping table entry including a target field storing a value,
selecting an action table entry in an action table, said action table entry in said action table comprising
a strand field storing an identifier for a strand,
an action field storing a value indicating said strand is in a tied mode, and
a tail pointer field storing a value equal to a value in a tail pointer register in said strand, and
writing said message to a location in a queue in said strand addressed using said value in said tail pointer field without requiring execution cycles from a hypervisor associated with said strand.

2. The computer based method of claim 1 wherein said configuring further comprises:
tying (i) a value in a head pointer register with a head pointer for said message queue stored in said hardware circuit and (ii) a value in a tail pointer register for said message queue with a tail pointer for said message queue stored in said hardware circuit so that said value in said head pointer register equals said stored head pointer and said value in said tail pointer register equals said stored tail pointer.

3. The computer based method of claim 1 wherein said using said hardware circuit further comprises:
using said logical identifier associated with said message to select said mapping table entry in a mapping table.

4. The computer based method of claim 3 wherein said using said hardware circuit further comprises:
using said value in said mapping table entry in said mapping table to select said action table entry in said action table.

5. The computer based method of claim 4 wherein said using said hardware circuit further comprises:
using said action table entry in said action table to determine said tail pointer for said message queue.

6. The computer based method of claim 5 wherein said using said hardware circuit further comprises:
appending said message to a location indicted by said tail pointer without requiring cycles of a hypervisor associated with said strand.

7. A processor comprising:
at least one strand including:
a message queue;
a head pointer register for said message queue; and
a tail pointer register for said message queue; and
a system interface unit comprising:
an action table having an action table entry including a tail pointer field, a head pointer field, an action field, and a strand field wherein when said action field stores a tied value and said strand field stores a value associated with said at least one strand, a value in tail pointer field equals a value in said tail pointer register and a value in said head pointer field equals a value in said head pointer register.

8. The processor of claim 7 wherein said system interface unit further comprises:
a mapping table having at least one mapping table entry, said at least one mapping table entry selected by a logical identifier and said at least one mapping table entry includes a target field having a value used in selecting said action table entry in said action table.

9. The processor of claim 8 wherein said mapping table is a device interrupt mapping table.

10. The processor of claim 8 wherein said mapping table is a message mapping table.

11. A computer implemented method comprising:
receiving, by a system interface unit in a processor, a message having a logical identifier;
using, by said system interface unit, said logical identifier to select a mapping table entry in a mapping table, said mapping table entry including a target field storing a value;
using, by said system interface unit, said value in said target field to select an action table entry in an action table, said action table entry in said action table comprising:
a strand field storing an identifier for a strand;
an action field storing a value indicating said strand is in a tied mode;
a tail pointer field storing a value equal to a value in a tail pointer register in said strand; and
writing, by said system interface unit, said message to a location in a queue in said strand addressed using said value in said tail pointer field without requiring execution cycles from a hypervisor associated with said strand.

* * * * *